Fig. 4

THEODORE R. WHITNEY
HOWARD E. WILLIAMS
INVENTORS

THEODORE R. WHITNEY
HOWARD E. WILLIAMS
INVENTORS

3,174,045
TWO CHANNEL RADIANT ENERGY BACK­GROUND SIGNAL ELIMINATION MEANS

Theodore R. Whitney, Woodland Hills, and Howard E. Williams, Redondo Beach, Calif., assignors, by mesne assignments, to The Bunker-Ramo Corporation, Stamford, Conn., a corporation of Delaware
Filed Aug. 19, 1959, Ser. No. 835,814
14 Claims. (Cl. 250—209)

This invention relates to radiant energy detection systems and, more particularly, to a new and improved radiation detection system in which the effects of ambient background radiation are suppressed.

In the prior art, numerous systems utilizing combinations of chopping reticles and energy sensitive cells have been disclosed for detecting and determining the position of bodies from which are emanated some form of detectable energy such as light, heat or radio frequency waves. A number of these prior art systems have afforded considerable sensitivity and accuracy in the detection of such bodies. However, especially in the field of visible or infrared target detection, there exists considerable need for improving the sensitivity and response speed of such systems so as to afford improved means for detecting and/or tracking moving bodies, objects or targets such as modern supersonic aircraft, missiles and rockets, especially under conditions where such targets appear against backgrounds from which, in turn, emanate considerable energy.

As will appear hereinafter, although the novel apparatus of the present invention finds particularly useful application to detection systems responsive to electromagnetic radiation falling within the infrared spectrum, the novel features of the present invention are also of advantage in radiant energy detection systems based upon the detection of other forms of radiant energy such as visible and invisible light rays. To this end, the term "optical," often employed as descriptive of visible light processing systems, will, as used in this specification, be construed as being also descriptive of systems for collecting, directing, refracting, transducing and detecting radiant energy other than that constituting visible light. Likewise, where hereinafter there are given examples of operating principles underlying the prior art and the improvements thereover offered by the present invention, in terms of a specific form of radiant energy such as infrared, such operating principles will be understood to have potential usefulness in systems responsive to other forms of radiant energy.

In order to best understand the present invention and the general problem to which it is directed, consideration will first be given to certain basic features of some prior art optical detection systems. In most prior art optical detection systems employed for detecting and determining the position of a target with respect to a given point of observation, the space in which it is suspected that an energy-emanating target may be present is systematically examined by an optical-type energy-collection apparatus. Such an energy collection apparatus generally employs combinations of mirrors and/or lenses and is designed to be responsive on a selective basis to only that energy which is collected within a given angular field of view. The response pattern of such apparatus is generally representable as a solid cone extending into space, with the apex of the cone positioned at the given point of observation. This angular field of view, or response pattern, is generally referred to as the "instantaneous field of view" or sometimes "field of view" of the collection apparatus. The optical axis of the collection apparatus, as projected into space, is, in most cases, centrally disposed within this instantaneous field of view so that the optical axis of the collection apparatus is in geometric coincidence with the axis of the conical response pattern of the apparatus.

The energy collected within the instantaneous field of view of the collection apparatus is directed to an energy sensitive cell which develops an electrical output potential or signal, the magnitude of which represents the intensity of the total radiant energy collected within the field of view. This total energy includes that which emanates from the target per se as well as background radiation energy, such as may emanate from the sky, clouds, water, etc., against which the target may appear. In accordance with prior art techniques, it is common to find that a circular, disc-like, "chopping reticle" is positioned within the energy collection apparatus at an image or focal plane therein. Such a reticle is rotated about its axis in interrupting relation to the total radiation collected by the apparatus so as to "chop" the radiation as it is directed to the energy sensitive cell. This type of reticle or episcotister is generally called a "chopping" reticle because it is comprised of a pattern of carefully dimensioned alternate areas of relative opacity and transmissivity to the energy or radiation collected by the apparatus. The shape of each of these areas often conforms to that of a sector of a circle. The areas of relative transmissivity, defined between adjacent areas of relative opacity on the reticle pattern, are sometimes called "reticle apertures" because it is through these openings, or apertures, that radiant energy is permitted to reach sensitive cell.

It has been the practice to align the rotational axis of the reticle with the optical axis of the collection apparatus, at an image or focal plane therein, so as to focus or "image" the instantaneous field of view on the reticle pattern. The field of view, as imaged on the reticle is generally referred to as the "imaged field of view."

In prior art systems employing such chopping reticles, the reticle is rotated, about its axis, at a selected angular velocity. As it rotates, the reticle apertures move within the imaged field of view and modulate the energy reaching the energy sensitive cell.

As a consequence, the cell then produces an output signal having a direct current component which is a direct function of the average value of energy reaching it. The cell output signal also generally has included in it a plurality of alternating current harmonically related modulation components, the largest and fundamental alternating current modulation component having a frequency which is termed the "chopping frequency" of the reticle. This fundamental alternating current component is sometimes called the "carrier" component of the cell output signal and is of a frequency value directly proportional to both the number of reticle apertures and the rotational velocity of the reticle.

In practice, target "surveillance," that is the detection of, position determination of, and the following of a given moving target with apparatus employing a chopping reticle, is accomplished in two steps, usually termed "search" and "track," respectively. First, in search, the entire collection apparatus is mechanically driven to execute a systematic scanning action which results in the exploratory examination of a volume of space which is many times greater than the instantaneous field of view subtended by the collection apparatus and, in which volume of space, it is suspected that an energy radiating target may be present. The output signal from the energy-sensitive cell is oftentimes recorded or stored, on a memory basis, as the search action proceeds. Thus, during or after completion of the search cycle, the apparatus may be automatically returned to one or more selected positions corresponding to those orientations of the apparatus which produced the largest amplitude carrier component in the cell's output signal. Such positions correspond to those orientations at which target energy has likely been detected. After redirection of the apparatus so that its field of view embraces that general volume in space in which target energy has been detected, the second or "track" step of the position determining process is initiated, namely, that of determining the position of the target with respect to the optical axis of the energy collection apparatus and causing the field of view to follow any target motion. This tracking action has in most instances been carried out by causing the optical axis of the collection apparatus to cyclically move or "nutate" around a circular path with respect to the volume of space which embraces the target.

More specifically, in one form of tracking system, during nutation, the optical axis of the energy collection system, as projected into space, is moved or "nutated" around a closed loop or path defined on a spherical surface in space. This path is so positioned and restricted in size as to afford pick-up of energy from the target during nutation of the instantaneous field of view. As a result, a frequency modulation will be imposed on the carrier component of cell's output signal. By comparing the phase of this frequency modulation with a reference signal having an instantaneous phase depicting the instantaneous position of the optical axis as it is nutated, the polar angular coordinate of the target, in a set of reference polar coordinates, may be ascertained. Similarly, the magnitude of the frequency modulation imposed on this carrier component will be a measure of the polar radius coordinate in this same set of coordinates. From this information, a servo control system may be brought into action to track or follow any target motion.

However, in the daytime, there appears along with the radiant energy collected from an object or target in space a substantial amount of ambient background radiation emitted by natural geographical formations, clouds and man-made structures, such as buildings. During daylight hours especially, the amount of reflected solar radiation from background objects is sometimes much greater than the radiation from the object or target to be sensed, so that the effective range and sensitivity of the detection system may be seriously limited. It is to this problem that the present invention is directed.

However, in one known optical detection system of the above-described type, the aforesaid effects of ambient background radiation are suppressed by spectral or color filtering techniques. In such a system of "background suppression," advantage is taken of the fact that the spectral distribution of the radiant energy emitted from most man-made objects or targets (such as jet aircraft, missiles, rockets, etc.), markedly differs from the spectral distribution of radiant energy either emitted or reflected from background objects. Thus, a special form of episcotister or chopping reticle is employed to modulate or chop the energy appearing at the imaged field of view and reaching the energy-sensitive cell. Similar to the above-described chopping reticle, this special reticle generally takes the form of a flat circular disc adapted to be spun or rotated about a central axis perpendicular to the faces of the disc. As before, the reticle is positioned at a focal plane of the associated collection apparatus. In contrast, however, to the previously described chopping reticle, which bears only a pattern defined by areas of relative opacity and transmissivity to all collected energy, this "spectral" or "color-filtering" reticle is made up of an even-numbered plurality of thin sector-like or pie-shaped spectral filters mounted adjacent to one another about the rotational axis of the reticle. spectral filters are provided in two equal numbered sets or types. The first set or type comprises filters all having a first given spectral transmission characteristic, while the second set comprises filters having a second given spectral transmission characteristic, the second characteristic being different from the first characteristic. The filters are arranged in alternation around the disc so that any two adjacent filters have different transmission characteristics, each corresponding to one or the other of the above first and second transmission characteristics.

The first and second given transmission characteristics assigned to these sets of filters are selected in terms of the spectral response characteristics of the energy sensitive cell taken in combination with the expected distribution of received target and background energies. Specifically, the filter transmission characteristics are made such that the magnitude of output signal developed by the cell is the same for either filter characteristic in response to typical background energy in the absence of target energy. However, in response to expected target energy, the output signal from the cell is different in magnitude for each type filter sector.

It can thus be seen that for a background having a specific spectral energy distribution corresponding to that for which the two filter transmission characteristics have been "designed," rotation of the reticle will produce virtually no change in the cell output signal. However, a substantial alternating output signal will be developed by the cell in response to targets emanating energy, the spectral energy distribution of which is different from the "design" background spectral distribution. Thus, this special "spectral" or "color-filtering" reticle will, in effect, chop target energy but will not chop background energy. The effects of background energies in target or object detection can, therefore, be seen to be suppressed by such spectral or color-filtering techniques.

Such a background suppression system has been found to be quite satisfactory under conditions where the spectral aspects of background conditions complement the design characteristics of the "color-filtering" reticle. As a practical matter, however, such special background conditions will not always be encountered. As the field of view of the energy collection apparatus is caused to search or track targets, a continuously changing spectral distribution of background energies can be expected. The random nature of this background change, of course, acts to reduce the over-all effectiveness of the above-described spectral or color filtering background suppression system.

Accordingly, it is an object of the invention to provide a new and significantly improved radiant energy detection system for automatically suppressing the effects of background radiation.

It is another object of the present invention to provide a new and improved radiation detection system for generating an output signal representing radiant energy received from a selected object which is substantially free of the effects of ambient background radiation.

It is still another object of the present invention to provide a new and improved radiant energy detection system in which signal components representing radiant energy received from a desired object are separated from ambient background radiation signals on the basis of differences in the spectral distribution characteristics of radiant energy received from selected objects and ambient background respectively.

It is a further object of the present invention to provide a new and improved radiant energy detection system in which the system is automatically adjusted to suppress the effects of ambient background radiation of varying spectral distributions.

It is yet another object of the present invention to provide a new and improved relation detection system having an increased range and efficiency of operation.

Still another object of the present invention is to provide a new and improved radiant energy detection system which is capable of precisely locating and tracking radiant energy emissive targets which appear in a field of view against a relatively high level of ambient background radiation.

In accordance with one aspect of the invention, a radiant energy detection system is provided in which radiant energy is collected by an optical system and two separate electrical signals are generated representing received radiant energy falling within two different spectral bands. Each of the generated electrical signals includes components representing ambient background radiation and at least one of the electrical signals contains components representing radiation from a source, the presence or location of which is to be determined by the detection system. These electrical signals are then combined to develop a control signal which is employed to adjust the relative amplitudes of the two electrical signals in a manner such that those components corresponding to ambient background radiation in each of the adjusted electrical signals are made substantially equal. An output signal is then derived representing the difference between the adjusted electrical signals so that the effects of ambient background radiation are substantially cancelled and the output signal represents radiant energy received from a selected source substantially free of the effects of ambient background radiation.

In one particular arrangement of the invention, separate generated electrical signals, as described above, are applied to separate variable gain amplifiers, respectively, with the output of each amplifier being applied to a signal combining arrangement from which a control signal is derived for application to the variable gain amplifiers to adjust the relative amplitudes of the electrical signals in directions respectively tending to equalize the components of the electrical signals representing ambient background radiation.

In accordance with another aspect of the invention, a radiation detection system is provided in which two separate electrical signals are generated representing received radiation falling within two different spectral bands, and the electrical signals are combined to generate an automatic gain control signal which is applied to a pair of variable gain amplifiers for the purpose of maintaining the peak amplitudes of the electrical signals both within a predetermined range. The input circuits of a second pair of variable gain amplifiers are then arranged to receive the individual output signals from the first pair of variable gain amplifiers, respectively, and the individual output signals delivered by the second pair of variable gain amplifiers are subtractively combined to develop a control signal which is, in turn, applied to the second pair of variable gain amplifiers for the purpose of automatically suppressing the effect of ambient background radiation. Alternatively, the output signals from the second pair of variable gain amplifiers may be demodulated to derive respective envelope signals representing the modulation envelope of each of the separate output signals. These envelope signals may then be subtractively combined to generate a control signal for application to the second pair of variable gain amplifiers.

In a searching mode of operation, an output signal may be derived representing the difference between the adjusted electrical signals thereby identifying the presence of an object emitting radiation falling unequally between the two different spectral bands.

In a tracking mode of operation in which radiant energy from a selected object is received and alternating current signals are generated representing radiation falling within two different spectral bands, the alternating current signals may be subtractively combined to produce a resultant signal representing radiant energy from the selected source which is substantially free of the effects of ambient background radiation.

A better understanding of the invention may be had from a reading of the following detailed description and an inspection of the drawings, in which.

Figures 1, 2:
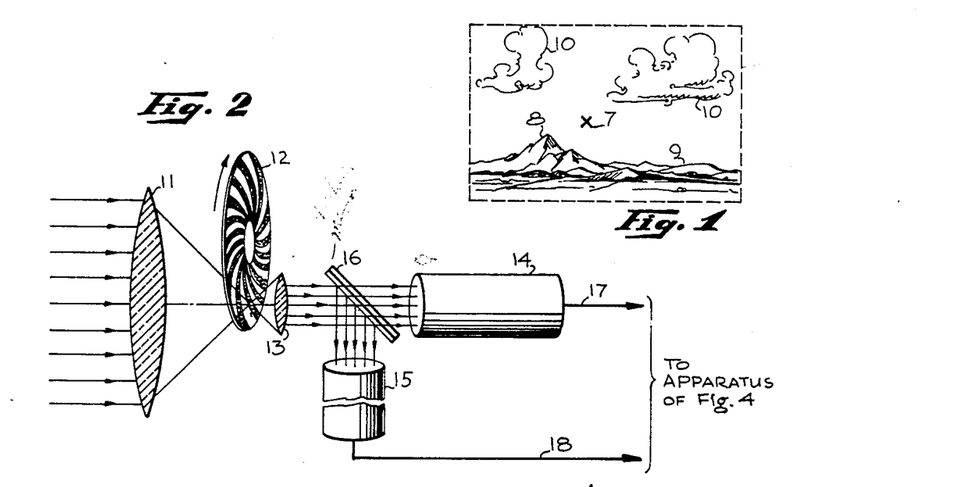
FIG. 1 is a simplified drawing of a scene from which may be received radiant energy emitted by a selected source along with ambient background radiation.
FIG. 2 is a diagrammatic illustration of a portion of a radiant energy system in accordance with the invention which is capable of producing two separate electrical signals corresponding to receive radiant energy falling within two different spectral bands.

In FIG. 1, there is illustrated a typical scene within which radiant energy in the infrared spectrum may be emitted by a selected source in the form of a target 7. Along with the radiation from the target 7 in the typical scene of FIG. 1, there may be emitted ambient background radiation from geographic formations in the shape of a mountain 8 and a land mass 9 as well as from the clouds 10. In conventional radiation detection systems in which it is desired to ascertain the presence and position of an object such as the target 7, the problem of discriminating between the radiation received from the target and the ambient background radiation produced by other objects within the field of view is difficult. Partcularly during the daytime hours, the reflected solar radiation from the background objects may approach the intensity of the radiation from the target 7 with the result that the presence of the target may go undetected. Accordingly, the distance at which the presence of the target 7 may be ascertained by known types of radiation detection systems is severely limited by the effects of ambient background radiation.

In practice, a scene such as that illustrated in FIG. 1 is scanned by an optical system having an instantaneous field of view which encompasses only an elemental part of the scene at any given time. Any suitable scanning pattern may be employed through a movement back and forth and up and down of the optical system as a whole so that upon the completion of an entire scanning pattern, radiation being emitted from any object within the scene is received.

In FIG. 2, there is illustrated diagrammatically one suitable system by means of which electrical signals may be generated representing the radiation received from a scene such as that of FIG 1. In the arrangement of FIG. 2, the optical system for collecting and focusing radiant energy received is illustrated diagrammatically by a lens 11. However, it will be appreciated that the lens 11 may comprise either a number of separate lens elements or, in the alternative, one or more mirrors having a configuration which achieves the desired collection and focusing of the radiant energy. Radiant energy from the optical system represented by the lens 11 is brought into focus at a focal plane in which is located a rotating chopping reticle 12, sometimes deferred to as an episcotister, which has alternate sectors which are transparent and opaque to the received radiant energy. Thus, as the reticle 12 rotates, the opaque sectors are swept across the field of view, thereby modulating the received radiant energy.

A secondary optical system represented diagrammatically by a lens 13 is placed behind the reticle 12 and serves to direct the modulated radiant energy passed by the reticle 12 toward a first radiation sensitive cell 14 and a second radiation sensitive cell 15. The separation of the received radiant energy passed by the secondary optical system 13 into two different spectral bands may be accomplished either by means of optical filters placed in front of each of the cells 14 or 15 or, in the alternative, by means of a dichroic mirror 16 as illustrated in FIG. 2. As is well known, a dichroic mirror functions to transmit radiation in one spectral band while it reflects radiation falling within another spectral band. By adapting the characteristics of the dichroic mirror 16 to work in conjunction with the individual characteristics of the radiation sensitive cells 14 and 15, electrical signals may be generated on the leads 17 and 18, each of which represents radiant energy falling within a different spectral band.

Figure 3:
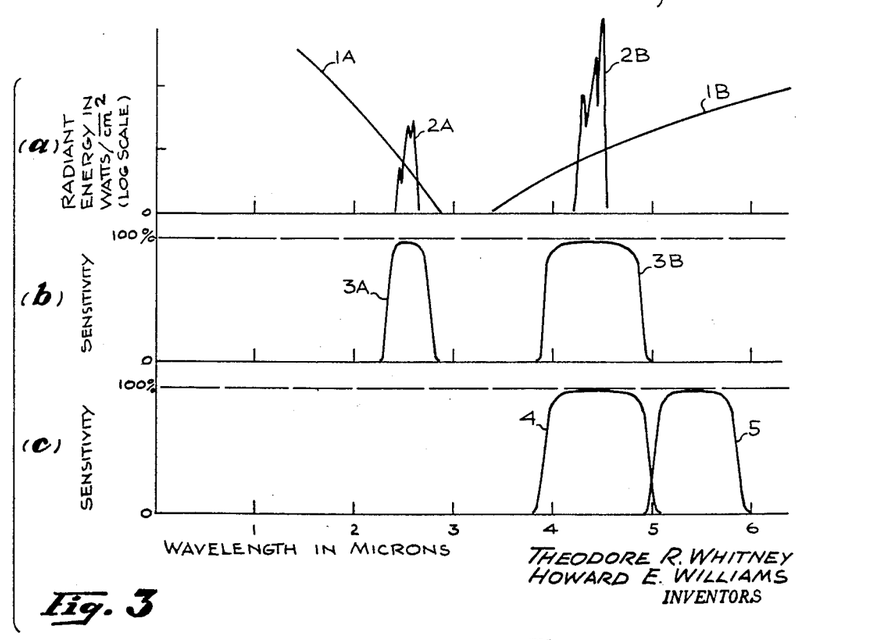
FIG. 3 is a set of graphical illustrations of the spectral distribution of radiant energy attributable to radiation from a selected source as well as from ambient background radiation, along with the response characteristics of separate channels in a system, in accordance with the invention.

In the graphical illustration of FIG. 3(a), there has been shown the spectral distribution of radiant energy received from a representative field of view in which there is present radiant energy attributable to a target and radiant energy attributable to background objects. Thus, over a first part of the spectral band, the ambient background radiation curve 1A slopes downwardly with increasing wave lengths and over a second part of the spectral band 1B the curve 1B rises with increasing wave lengths.

Although energy received from a target will be superimposed upon the background radiation represented by the curves 1A and 1B, for convenience, the target radiation from a typical target has been separately represented by curves 2A and 2B in FIG. 3(a).

Accordingly, at about 2.7 microns wave length, the curve 2A indicates that radiation in substantial quantity is received attributable to a portion of the waste products emitted by a missile or the like. In a similar fashion, at about 4.5 microns there appears a substantial amount of radiation represented by the curve 2B which is attributable to fundamental radiation from hot exhaust gases emitted by a missile or the like.

In one arrangement of the invention, the optical filters or dichroic mirror taken together with the characteristics of the radiation sensitive cells 14 and 15 of FIG. 2 generate a first electrical signal corresponding to radiant energy represented by the curve 3A of FIG 3(b) within a first spectral band. In a second spectral band which is substantially mutually exclusive of the first spectral band, a second electrical signal corresponding to radiant energy represented by the curve 3B of FIG. 3(b) is generated. Where the filter characteristics taken in conjunctions with the response of the cells 14 and 15 are chosen in accordance with the characteristics illustrated by the curves 3A and 3B in FIG. 3(b), there is generated in a first channel an electrical signal corresponding to received radiation encompassed by the curve 3A between 2.0 and 3.0 microns, and there is generated in a second channel an electrical signal corresponding to received radiant energy falling within a second spectral band encompassed by the curve 3B between 3.8 and 5 microns.

Although in the particular example given above there may appear in each of the two channels signals attributable to both ambient background radiation and target radiation, in an alternative arrangement of the invention one of the spectral bands may be arranged to receive only ambient background radiation substantially free of target radiation. Thus, for example, in FIG. 3(c) one of the optical filter arrangements may be adapted to pass received radiation falling within a spectral band encompassed by the curve 4 in which there appears target energy and the other may be adapted to pass received radiation falling within a spectral band encompassed by a curve 5 in which there appears substantially no target radiation. The response characteristics of a system represented by FIG. 3(c) are preferable since the background signals in each channel are more nearly alike and since target energy appears in only one channel. In any event, by means of optical filters selected in accordance with the foregoing, the arrangement of FIG. 2 may be adapted to generate two electrical signals on the leads 17 and 18 which correspond to received radiant energy falling within two separate spectral bands, both of which contain ambient background radiation, and at least one of which contains target radiation.

Figure 4:
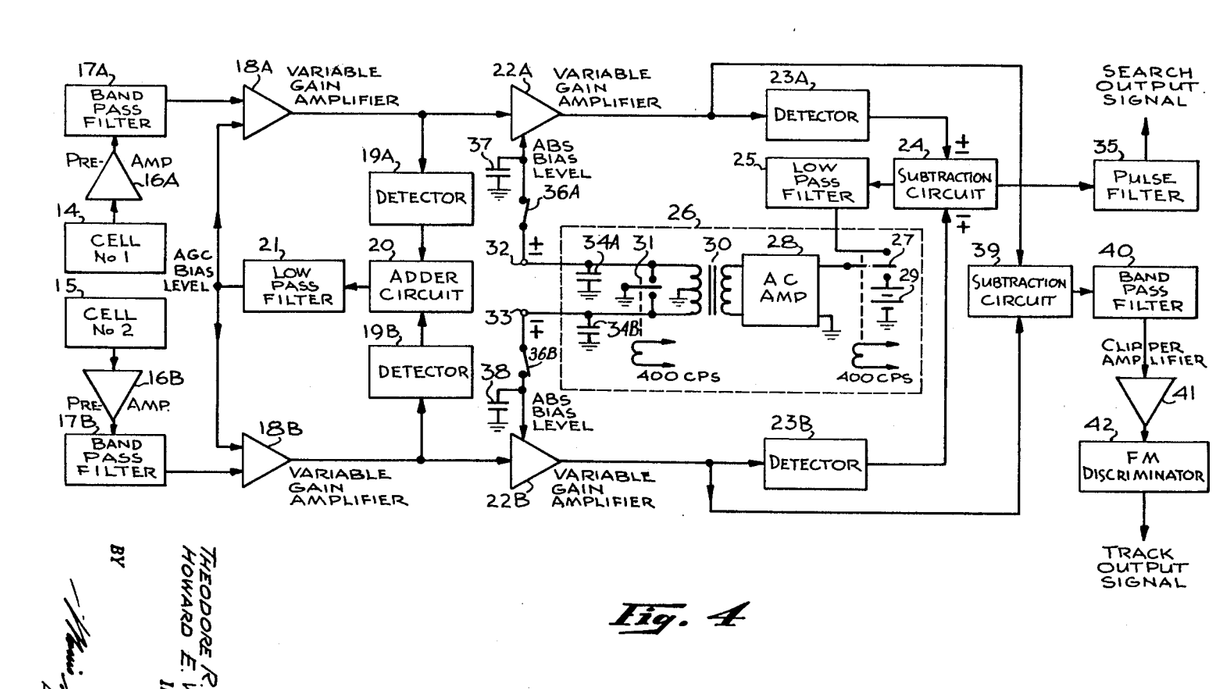
FIG. 4 is a block diagram of a portion of a radiation energy detection system, in accordance with the invention, in which the effects of ambient background radiation are substantially suppressed.

In accordance with the invention, the two separate signals derived from the arrangement of FIG. 2 are employed to achieve an automatic suppression of the effects of ambient background radiation so as to generate an electrical signal representing the target radiation substantially free from ambient background radiation. A system in accordance with the invention for achieving automatic background suppression is illustrated in FIG. 4 in which the electrical signals generated by the cells 14 and 15 (the same reference characters being employed as in FIG. 2) are passed through separate channels in each of which there may be included a preamplifier 16A, 16B. The amplified signals from the preamplifiers 16A and 16B are applied to the band pass filters 17A and 17B, respectively, which function to pass the alternating current signals and side bands produced by the modulation of the radiation though the rotation of the reticle 12 of FIG. 2.

The band pass filters 17A and 17B should be designed to have a center frequency corresponding to the frequency of the generated alternating current signals and a band width encompassing the side bands surrounding the center frequency. For example, where the speed of rotation of the reticle 12 and the number of opaque sections, i.e. spokes, contained therein produce amplitude modulated signals at the output of the cells 14 and 15 having a frequency of 5,000 cycles per second, the band pass filters 17A and 17B sholud be designed to have a center frequency of 5,000 cycles per second. The band width of each of the band pass filters 17A and 17B is determined by the dwell time during which energy from a target is passed by one of the transparent sectors of the reticle 12 of FIG. 2. With a 5,000 cycles per second alternating current signal being generated, the dwell time equals 40 milliseconds and the band width of each of the band pass filters 17A and 17B may be 500 cycles per second. In operation, the band pass filters 17A and 17B function to block the passage of high frequency noise which may be generated by the cells 14 and 15 outside of the pass band of the filters.

In the operation of radiation detection systems, it has been found that the amplitude ranges of the received signals vary over extremely wide ranges. For example, it is not unusual to find amplitude ranges of 10,000:1 in a radiation detection system of the type to which the present invention relates.

In accordance with one aspect of the invention, it is desirable to compress the amplitude ranges of the signal so as to insure a proper operation of the automatic background suppression components. Thus, in FIG. 4, signals from the upper channel band pass filter 17A are applied to a variable gain amplifier (AGC) 18A and similarly, the signals from the band pass filter 17B in the lower channel are applied to a variable gain amplifier (AGC) 18B. Output signals from the AGC variable gain amplifiers 18A and 18B are each applied to the detectors 19A and 19B, respectively, which function to demodulate the alternating current signals so that each of the detectors 19A and 19B functions to generate an output signal representing the amplitude of the alternating current signals in the separate channels. The output signals from detectors 19A and 19B are then applied to an adder 20 which combines the signals to produce a composite output signal representing the total of the amplitudes of the signals in each of the separate channels.

The composite signal from the adder 20 is applied to a low pass filter 21 which functions to block the passage of any unwanted alternating current signals which may appear at the outputs of the detectors 19A and 19B. For example, with alternating current signals of 5,000 cycles per second as set forth above, the low pass filter 21 may have a pass band from zero to 1,000 cycles per second. The output signal from the low pass filter 21 represents the total of the amplitudes of the alternating current signals in each of the channels and is applied to the variable gain amplifiers 18A and 18B which function in a conventional fashion to limit the amplitude range of the signals passed thereby. Since biasing arrangements for variable gain amplifiers which function to lower the gain in accordance with increases in control voltage and raise the gain in accordance with decreases in control voltage are well known, it is apparent that there may be achieved at the output of the variable gain amplifiers 18A and 18B alternating current signals having amplitude ranges which are limited within a dynamic range of 10:1.

Amplitude limited signals from the variable gain amplifiers 18A and 18B are applied to a second set of variable gain amplifiers 22A and 22B, each of which is designated (ABS) to represent its function as a part of the apparatus in accordance with the invention for achieving automatic background suppression. The outputs of each of the variable gain amplifiers 22A and 22B are applied to the detectors 23A and 23B, respectively. Each of the detectors 23A and 23B functions to demodulate the alternating current signals passed by the amplifiers 22A and 22B so as to generate respective output signals representing the amplitude variations of the alternating current signals. The outputs from the detectors 23A and 23B are applied to a subtraction circuit 24 which subtractively combines the output signals from the detectors 23A and 23B so as to generate a signal representing the difference between the signals applied thereto.

Although various types of subtraction circuits are well known, the function of subtractively combining the signals in the arrangement of FIG. 4 may be achieved by employing conventional diode rectifiers for the detectors 23A and 23B which are oppositely poled with respect to one another. With oppositely poled diodes being employed in the detectors 23A and 23B, a conventional adder circuit may be employed in place of the subtraction circuit 24 since the output signal from one of the detectors will be positively oriented, while output signal from the other of the detectors will be negatively oriented.

In any event, a difference signal is provided which is applied to a low pass smoothing or averaging filter 25 which functions to integrate the difference signal. For example, a low pass filter having a pass band from 0–5 cycles per second may be employed as the smoothing filter 25. The function of the smoothing filter 25 is to produce an output signal which represents substantially only the components of the difference signal attributable to ambient background radiation. Since in the scanning of a scene by the optical system of FIG. 2, ambient background radiation appears across the entire scene, while target radiation appears as a substantially point source, it may be expected that the alternating current signals generated by the cells 14 and 15 possess like characteristics in which ambient background radiation components fluctuate relatively slowly in amplitude while target radiation components appear as pulses. Therefore, the smoothing filter 25 blocks the passage of any component of the difference signal attributable to target information.

Signals from the output of the smoothing filter 25 are applied to a push-pull D.C. amplifier arrangement 26 which functions to provide two separate output signals which are out-of-phase with respect to one another. That is, an increase in the signal from the smoothing filter 25 produces an increase on one output lead from the push-pull D.C. amplifier and a decrease on the other output lead, while a decrease in the signal from the smoothing filter 25 produces a decrease on the first mentioned output lead and an increase on the second output lead of the push-pull D.C. amplifier.

Although any suitable arrangement for accomplishing the aforementioned result may be employed, there is illustrated in FIG. 4 one particular arrangement of a push-pull D.C. amplifier. In the illustrative arrangement, a signal from the smoothing filter 25 is applied to one fixed contact of a vibratory switch 27 which is connected to an A.C. amplifier 28. The vibratory switch 27 may comprise a conventional chopper which is operated at 400 cycles per second to alternately connect a fixed reference voltage source 29 and the signal from the low pass filter 25 to the input of the A.C. amplifier 28. Accordingly, at the output of the A.C. amplifier 28 there appears a carrier wave which is amplitude modulated in accordance with the magnitude of the signal from the low pass filter 25.

The amplified carrier wave from the A.C. amplifier 28 is passed by a transformer 30 to the secondary winding of which there is connected a second vibratory switch 31 which functions as a synchronous rectifier with respect to signals appearing at opposite ends of the secondary winding of the transformer 30. With the center tap of the secondary winding of the transformer 30 being grounded, there appears on one output lead 32 an amplified signal corresponding to the signal passed by the smoothing filter 25 which is positively oriented and on the lead 33 a similar signal which is negatively oriented.

In order to remove any undesirable alternating current components produced by the modulation and demodulation process in the carrier D.C. amplifier, a pair of filter capacitors 34A and 34B may be connected between the leads 32 and 33 and ground. The output signal appearing on the lead 32 is applied to the ABS variable gain amplifier 22A in the upper channel while the output signal appearing on the lead 33 is applied to the ABS variable gain amplifier 22B in the lower signal channel.

In operation, whenever an inequality exists between the signals in the upper and lower signal channels, there is developed a difference signal, which when passed by the smoothing filter 25 represents substantially only a difference between the components attributable to ambient background radiation. The push-pull D.C. amplifier generates voltages which are applied to the ABS variable gain amplifiers in a direction and of a magnitude which alters the gain of the variable gain amplifiers to reduce the inequality between the signals in the separate signal channels. A closed loop servo system is thereby established which functions to achieve a null balance at the output of the smoothing filter 25. Since the output signal from the smoothing filter 25 represents substantially only an inequality with respect to ambient background radiation components, there is achieved a cancellation or suppression of the components attributable to background radiation at the output of the subtraction circuit 24.

In contrast, signal components which are attributable to target information are substantially in pulse form so long as the system is being operated in a mode in which the scene is being scanned for searching purposes and the target is a point source across which the optical system passes. A corresponding electrical signal in pulse form appears at the output of the subtraction circuit 24 which may be selected from any undesirable signals present by means of a pulse filter 35. The filter 35 may, for example, comprise a low pass filter having a pass band from zero to an upper frequency limit determined by the duration of a typical pulse attributable to target radiation. Since the output signal from the pulse filter 35 represents substantially only target radiation, the system in accordance with the invention functions to suppress the effects of ambient background radiation so that the radiation detection system is capable of sensing the presence of a target even where the field of view embraces a relatively large amount of ambient background radiation.

In the description of the operation of the above described system, it has been assumed that the optical system is scanned across a field of view searching for the existence of radiant energy emissive targets. The result is that radiant energy emitted by a target is within the field of view of the system only momentarily so that the target radiation produces a pulse at the output of the pulse filter 35 while the suppressed ambient background radiation does not.

In a different mode of operation, the above described system may be employed for tracking a selected target from which radiant energy is received continuously. For this purpose, there may be connected to the output of the pulse filter 35 various threshold, correlation and decision circuitry (not shown) which functions to identify a particular target for tracking. By energizing a switching arrangement such as a relay whenever a selected target is identified, the optical system may be switched to a tracking mode in which radiant energy from the target is received substantially continuously. In one type of tracking system, a special movement of the reticle known as nutation is performed in which the axis of rotation of the reticle revolves about the image in the focal plane. The result is that the speed of the spokes passing through the focal plane varies as the axis of the reticle revolves to impart a frequency modulation to the electrical signal produced by the radiation sensitive cells in response to the target. Since the smoothing filter 25 responds to and integrates substantially continuous signals, there appears at the output of the filter a signal corresponding to the difference between target components as well as background components appearing in the separate channels. Therefore, the output of the filter no longer distinguishes between background components and target signal components and is unsuitable for use in adjusting the background signal components to achieve cancellation.

In the system of FIG. 4, the above problem is overcome by means of a pair of switches 36A and 36B connected between the push-pull D.C. amplifier and the variable gain amplifiers 22A and 22B. The switches 36A and 36B may comprise contacts on the aforementioned relay which responds to switching of the system from the searching mode of operation to a tracking mode of operation. Therefore, during a tracking mode, the switches 36A and 36B are opened and a pair of relatively large capacitors 37 and 38 maintain a level of charge corresponding to the background signal adjustment just prior to the switch from a searching to a tracking mode of operation. Since the spectral distribution of the background radiation remains substantially constant where the system is pointed in the same general direction, there continues to be effected an equalization of the background signal components appearing in each of the separate channels.

The alternating current signals appearing at the output of the variable gain amplifiers 22A and 22B are applied to a subtraction circuit 39 within which the background signals are substantially cancelled and at the output of which there appears the frequency modulated wave representing target information. By means of a band pass filter 40, the frequency modulated wave may be separated from unwanted alternating current components for application to a clipper amplifier 41 which functions as an amplitude limiter. The amplitude limited signal from the clipper amplifier 41 may be applied to an FM discriminator 42 which functions to demodulate the frequency modulated target signal components, and the demodulated signal may then applied to suitable servo systems (not shown) for positioning the optical system to effect a tracking operation as well as to control the guidance of interceptor missiles for a vehicle carrying the detection system itself, if desired.

Figure 5:
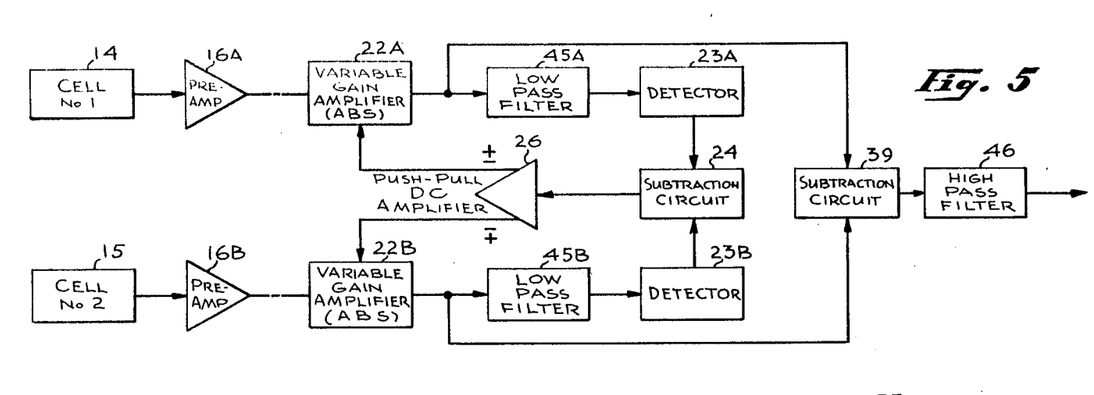
FIG. 5 is a block diagram of an alternative arrangement of a radiation energy detection system, in accordance with the invention, useful particularly in a tracking mode of operation.

Although the capacitors 37 and 38 of the system of FIG. 4 are capable of maintaining the relative gains of the amplifiers 22A and 22B for a period of time which is sufficient for many purposes in which the tracking operation takes place over a relatively short period of time, there is illustrated in FIG. 5 an alternative arrangement in which automatic background suppression may be effected on a continuous basis over extended periods of time where necessary.

In FIG. 5, the same reference characters have been employed as in FIG. 4 to designate similar parts. Thus, signals derived from two separate radiant energy sensitive cells 14 and 15 are amplified in separate channels by means of the preamplifiers 16A and 16B. In the arrangement of FIG. 5, low frequency signals are applied to the variable gain amplifiers 22A and 22B as discussed below. Between the preamplifiers 16A and 16B and the automatic background suppression amplifiers 22A and 22B there may be connected, if desired, a pair of automatic gain control variable gain amplifiers as shown in FIG. 4.

At the inputs to the variable gain amplifiers 22A and 22B of FIG. 5 there appears a low frequency unmodulated signal corresponding to variations in radiation received from background objects along with an alternating current wave produced by the action of the rotating reticle upon the radiation received from background objects and a frequency modulated alternating current signal where the arrangement of FIG. 5 is employed in a tracking mode with a revolving reticle following a nutational pattern as described previously.

In the arrangement of FIG. 5, a pair of low pass filters 45A and 45B function to pass the low frequency component of the signal in each channel only so that there appears at the outputs of the detectors 23A and 23B a signal corresponding to the received ambient background radiation in each channel as represented by the low frequency fluctuating wave. In practice, it has been found that the low frequency component corresponds closely to the alternating current components attributable to the modulation of the received background radiation. Accordingly, by means of a subtraction circuit 24, there may be derived a difference signal representing the difference in the signals appearing in each of the separate channels attributable to ambient background radiation. As before, the difference signal from the subtraction circuit 24 may be applied to a push-pull D.C. amplifier 26 which functions to adjust the gains of the variable gain amplifiers 22A and 22B in directions which tend to equalize the components attributable to background radiation in each of the separate channels.

By means of a subtraction circuit 39 which receives the alternating current signals from the variable gain amplifiers 22A and 22B, there is derived a difference signal and by means of a high pass filter 46 the frequency modulated target signal may be separated from any undesired signals appearing at the output of the subtraction circuit 39.

In operation, the arrangement of FIG. 5 is based upon the assumption that a good correlation occurs between the low frequency signals passed by the cells 14 and 15 corresponding to ambient background radiation and the alternating current components produced by the action of the reticle in modulating the ambient background radiation. In practice, the correlation between the two signals has been found to be quite good so that by means of the arrangement of FIG. 5 the continuous suppression of ambient background signals may be provided in a radiation detection system during a tracking mode of operation. Signals from the high pass filter 46 may be applied to conventional limiting and FM discriminating arrangements as illustrated in FIG. 4 and described in detail above.

In the system shown in FIG. 4 and described in detail above, there is included an automatic gain control system in which the output signals from a pair of variable gain amplifiers are detected and added to develop a composite signal representing the total of the signals appearing in both signal channels. The composite signal is then passed through a low pass filter for application to the variable gain amplifiers to limit the dynamic range of the signals in each channel. While the illustrated system comprises one suitable arrangement for achieving an automatic gain control, there is illustrated in FIG. 6 an alternative arrangement which possesses the advantage of overcoming any non-linearity which may occur in the automatic gain control characteristics of two separate variable gain amplifiers operated independently.

Figure 6:
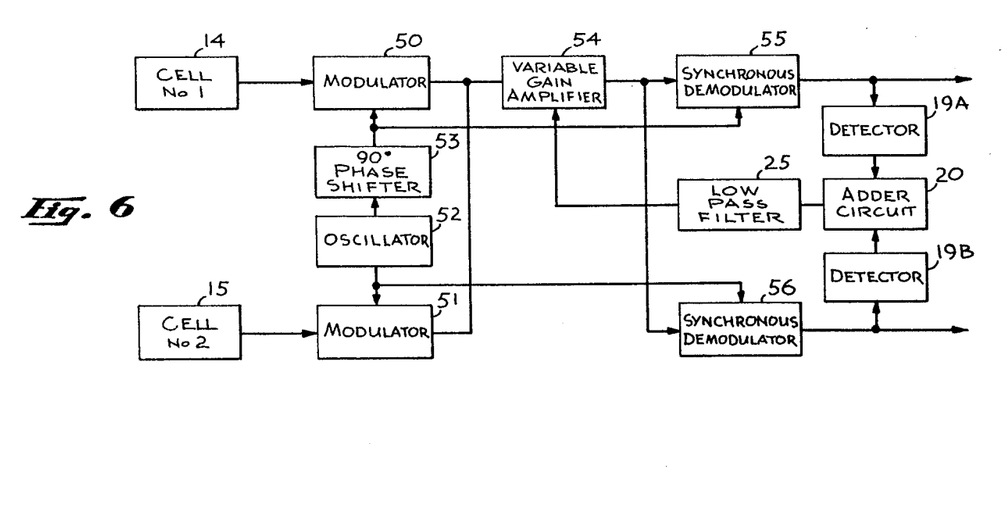
FIG. 6 is an alternative arrangement of an automatic gain control system which may be employed in conjunction with an automatic background suppression system in a radiation detection system, in accordance with the invention.

In the arrangement of FIG. 6, signals from two separate radiation sensitive cells 14 and 15 are applied to a pair of modulators 50 and 51 which receive an alternating current carrier wave from an oscillator 52. In one channel, the carrier wave is applied directly to the modulator 51 while in the other channel the carrier wave passes to the modulator 50 via a phase shifter which shifts the phase of the carrier wave by 90°. Output signals from the modulators 50 and 51 are combined to develop an amplitude modulated carrier wave having two quadrature phase components, each of which represents the output from one of the cells 14 and 15. The oscillator frequency should be substantially higher than the highest frequency received from either of the cells 14 or 15, and may be, for example, 30,000 cycles per second where an alternating current wave supplied by the cells 14 and 15 has a frequency of 5,000 cycles per second.

The quadrature modulated wave from the modulators 50 and 51 may be applied to a variable gain amplifier 54 which is included for the purpose of achieving an automatic gain control. The output signal from the variable gain amplifier may be applied to two synchronous demodulators one of which receives the carrier wave directly from the oscillator 52 and the other of which receives a wave via the 90° phase shifter 53.

The synchronous demodulators 55 and 56 function to demodulate the wave from the variable gain amplifier so as to derive each of the quadrature phased components. Thus, at the output of the synchronous modulator 55 there appears an amplified signal corresponding to the signal provided by the cell 14, while at the output of the synchronous demodulator 56 there appears a signal corresponding to the output signal from the cell 15. The alternating current signals from the synchronous demodulators 55 and 56 are then applied to the detectors 19A and 19B which function to rectify the signals in each channel for application to an adder circuit 20.

At the output of the adder circuit there appears a composite signal representing the total value of the signals appearing in the separate signal channels which is passed by a low pass filter 25 and applied to the variable gain amplifier 54. Since the quadrature modulated wave passing through the variable gain amplifier 54 includes components representing both the signal from the cell 14 and the signal from the cell 15, an automatic gain control is achieved through an adjustment of the gain of the variable gain amplifier 54 to limit the dynamic range of the signals. Since only a single variable gain amplifier is employed in the automatic gain control system of FIG. 6, the aforementioned difficulties attributable to the nonlinearity of two separate automatic gain control amplifiers are overcome. Since the automatic gain control system of FIG. 6 may be employed in either the arrangement of FIG. 4 or FIG. 5, an additional pair of variable gain amplifiers may be connected to receive the signal outputs of the synchronous demodulators 55 and 56, with the remainder of the system corresponding to either FIG. 4 or FIG. 5 as desired.

Although there has been described above a radiation detection system in accordance with the invention which may be employed for the automatic suppression of the effects of ambient background radiation, it will be appreciated that the specific arrangements of FIGS. 2, 4, 5 and 6 are given by way of example only of the manner in which the principles of the present invention may be used to advantage. Accordingly, any and all variations, modifications, or equivalent arrangements falling within the scope of the annexed claims should be considered to be a part of the present invention.

We claim:

1. In an electro-optical radiation detection system in which radiant energy is received from a target having a given spectral distribution along with ambient background radiation having a spectral distribution which differs substantially from the spectral distribution of radiant energy received from the target, the combination of an optical system for collecting radiant energy emanating from a volume of space falling within a conditionally movable field of view, a first signal channel including a radiation sensitive cell arranged to receive radiant energy collected by said optical system falling within a first spectral band, a second signal channel including a radiation sensitive cell arranged to receive energy collected by the optical system falling within a second spectral band, continuously operable background suppression means comprising at least one variable gain amplifier included in one of said signal channels, means coupled to said first and second signal channels and to said variable gain amplifier for effecting an equalization of signal components in each of said channels having frequencies falling below a predetermined frequency corresponding to background energy, and target indicating means coupled to said first and second signal channels for generating an output signal corresponding to target energy substantially free from the effects of background radiation.

2. In an electro-optical radiation detection system in which received radiant energy comprises energy emanating from a target along with ambient background radiation, the combination of an optical system for collecting radiant energy falling within a field of view which is conditionally movable with respect to a volume of space, means for separating the energy collected by the optical system into two differing spectral bands, a first radiation sensitive cell arranged to receive energy within one of said spectral bands, a second radiation sensitive cell arranged to receive energy within the other of the spectral bands, a first electrical signal channel including a variable gain amplifier coupled to the first radiation sensitive cell, a second electrical signal channel including a variable gain amplifier coupled to said second radiation sensitive cell, background suppression means coupled to said first and second electrical signal channels for controlling the gains of each of said variable gain amplifiers to effect an equalization of background signal components in each of said signal channels, and means coupled to said first and second electrical signal channels for combining the electrical signals passed by said variable gain amplifiers to produce an output signal representing target radiation substantially free of the effects of ambient background radiation.

3. In a radiation detection system which receives radiant energy from a selected source along with ambient background radiation where the spectral distribution of radiant energy received from said selected source differs markedly from the spectral distribution of said ambient background radiation, the combination of means generating a first electrical signal representing received radiation falling within a first spectral band, means generating a second electrical signal representing received radiation falling within a second spectral band, means for subtractively combining said first and second electrical signals to obtain a third electrical signal representing the difference between said first and second electrical signals and variable gain means operable upon at least one of said first and second electrical signals receiving said third electrical signal for adjusting the relative magnitudes of said first and second electrical signals in response to said third electrical signal whereby said third electrical signal represents radiant energy received from said selected source substantially free from ambient background radiation.

4. In a radiation detection system which receives energy from a selected source along with ambient background radiation where the radiation from the selected source has a spectral distribution differing markedly from the spectral distribution of the ambient background radiation, the combination of means for generating a first electrical signal representing received radiation falling within a first spectral band, means for generating a second electrical signal representing received radiation falling within a second spectral band, means for subtractively combining said first and second electrical signals to obtain a third electrical signal, a variable gain amplifier receiving at least one of said first and second electrical signals for altering the relative amplitudes of said first and second electrical signals in accordance with the magnitude of said third electrical signal, and means for combining said first and second electrical signals to provide a resultant signal representing radiation received from said selected source substantially free from ambient background radiation.

5. In a radiation detection system for receiving radiation from a selected energy source along with ambient background radiation where the radiation from the selected source has a spectral distribution differing markedly from the spectral distribution of the ambient background radiation, the combination of means generating a first electrical signal representing energy received falling within a first spectral band, means generating a second electrical signal representing energy received falling within a second spectral band substantially exclusive of said first spectral band, means for subtractively combining said first and second signals to obtain a direct current control signal representing the difference in background radiation in said first and second electrical signals, and at least one variable gain amplifier for adjusting the relative amplitude of said first and second electrical signals in response to said direct current control signal whereby the difference between said first and second electrical signals represents radiation from said selected source substantially free from ambient background radiation.

6. In a radiant energy detection system for receiving radiant energy from a selected source along with ambient background radiation where the spectral distribution of the radiation from said selected source differs markedly from the spectral distribution of said ambient background radiation, the combination of means generating an alternating current signal representing received radiant energy falling within a first spectral band, means generating a second alternating current signal representing received radiant energy falling within a second spectral band substantially exclusive of said first spectral band, a first variable gain amplifier coupled to said first electrical signal generating means for amplifying said first electrical signal, a second variable gain amplifier coupled to said second electrical signal generating means for amplifying said second electrical signal, a first detector coupled to said first variable gain amplifier for deriving a first unidirectional signal from said first alternating current signal, a second detector coupled to said second variable gain amplifier for deriving a second unidirectional signal from said second alternating current signal, means coupled to said first and second detectors for subtractively combining said first and second unidirectional signals, and background suppression means coupled between said combining means and said first and second variable gain amplifiers for controlling the gains of each of said variable gain amplifiers to effect an equalization of background signal components applied to said subtractive combining means.

7. Apparatus in accordance with claim 6 including means coupled to said first and second variable gain amplifiers for subtractively combining said first and second alternating current signals to provide a resultant signal representing radiation from said selected source substantially free of ambient background radiation.

8. In a radiation detection system for receiving radiant energy from a selected source along with ambient background radiation where the spectral distribution of the radiant energy from said source differs markedly from the spectral distribution of said ambient background radiation, the combination of means generating a first alternating current signal representing radiation from said selected source and ambient backbround radiation falling within a first spectral band, means for generating a second alternating current signal having components representing ambient background radiation falling within a second spectral band substantially exclusive of said first spectral band, a first variable gain amplifier coupled to said first alternating current signal generating means for amplifying said first alternating current signal, a second variable gain amplifier coupled to said second alternating current signal generating means for amplifying said second alternating current signal, a first detector coupled to said first alternating current amplifier for deriving a unidirectional voltage from said first alternating current signal, a second detector coupled to said second variable gain amplifier for deriving a second unidirectional signal representing said second alternating current signal, means coupled to said first and second detectors for subtractively combining said first and second unidirectional signals, frequency discriminating means coupled to said subtractive combining means for passing only those electrical signals having frequencies below a predetermined frequency, and means coupled between said frequency discriminating means and said variable gain amplifiers for altering the gains of said first and second variable gain amplifiers in accordance with signals passed by said frequency discriminating means whereby components of said first and second alternating current signals attributable to ambient background radiation are substantially equalized.

9. Apparatus in accordance with claim 8 including means coupled to said combining means for deriving a resultant electrical signal representing radiation received from said selected source substantially free of ambient background radiation.

10. Apparatus in accordance with claim 8 including a second combining means coupled to said first and second variable gain amplifiers for deriving a resultant signal which is substantially free of components attributable to ambient background radiation.

11. In a radiation detection system for receiving radiation from a target along with ambient background radiation where the spectral distribution of the radiation from the target differs markedly from the spectral distribution of the ambient background radiation, the combination of means deriving a first alternating current signal having components attributable to target radiation and components attributable to ambient background radiation all of which fall within a first spectral band only, means deriving a second alternating current signal having components attributable to background radiation falling within a second spectral band substantially exclusive of said first spectral band, a first variable gain amplifier coupled to said first alternating current signal deriving means, a second variable gain amplifier coupled to said second alternating current signal deriving means, signal detection and subtractive combining means coupled to said first and second variable gain amplifiers for deriving a difference signal, a low pass filter coupled to said signal detection and combining means, and background suppression means coupled between the low pass filter and said first and second variable gain amplifiers for controlling the gains of said first and second variable gain amplifiers in an opposite sense whereby the components attributable to background radiation in each of said first and second alternating current signals are maintained substantially equal.

12. Apparatus in accordance with claim 11 including means coupled to said signal detection and combining means for deriving a resultant signal representing target radiation substantially free of components attributable to ambient background radiation.

13. Apparatus in accordance with claim 11 including an automatic gain control system coupled between said first and second alternating current signal deriving means for maintaining the dynamic range of signals passing therethrough within predetermined limits.

14. The process of deriving an electrical signal representing radiant energy received from a target where the radiant energy received from the target is accompanied by ambient background radiation including in combination the steps of generating a first electrical signal representing received radiant energy falling within a first spectral band, generating a second electrical signal representing received radiant energy falling within a second spectral band substantially exclusive of said first spectral band, subtractively combining said first and second signals, deriving from said combined signal a portion representing substantially only said background radiation, continuously adjusting the gain of at least one amplifier through which said first and second signals pass in accordance with said background radiation portion of said combined signal, and detecting the difference between said first and second electrical signals representing target radiation substantially free from the effect of ambient background radiation.

References Cited in the file of this patent
UNITED STATES PATENTS

| | | |
|---|---|---|
| 2,489,223 | Herbold | Nov. 22, 1949 |
| 2,591,837 | Lee | Apr. 8, 1952 |
| 2,794,926 | Watts et el. | June 4, 1957 |
| 2,803,752 | Warren | Aug. 20, 1957 |
| 2,834,247 | Pickels | May 13, 1958 |
| 2,927,212 | Shimukonis et al. | Mar. 1, 1960 |
| 2,930,893 | Carpenter et al. | Mar. 29, 1960 |
| 2,931,911 | Nichols | Apr. 5, 1960 |
| 2,978,577 | Ketchledge | Apr. 4, 1961 |
| 3,002,096 | Eckweiler et al. | Sept. 26, 1961 |
| 3,030,503 | Kahn | Apr. 17, 1962 |
| 3,031,576 | Loy | Apr. 24, 1962 |